United States Patent
Gormley (10) Patent No.: US 9,915,226 B2
(45) Date of Patent: Mar. 13, 2018

(54) VARIABLE AREA FAN NOZZLE HIDDEN BLOCKER DOOR THRUST REVERSER

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 301 days.

(21) Appl. No.: 14/743,649

(22) Filed: Jun. 18, 2015

(65) Prior Publication Data

US 2016/0369744 A1    Dec. 22, 2016

(51) Int. Cl.
*F02K 1/72* (2006.01)
*F02K 1/09* (2006.01)

(52) U.S. Cl.
CPC . *F02K 1/72* (2013.01); *F02K 1/09* (2013.01)

(58) Field of Classification Search
CPC ... F02K 1/09; F02K 1/62; F02K 1/625; F02K 1/64; F02K 1/72; F02K 1/74; F02K 1/76; F02K 1/70; B64C 21/08
See application file for complete search history.

(56) References Cited

U.S. PATENT DOCUMENTS

| | | | | |
|---|---|---|---|---|
| 3,036,431 A | * | 5/1962 | Vdolek | F02K 1/625 239/265.31 |
| 5,778,659 A | * | 7/1998 | Duesler | F02K 1/09 239/265.27 |
| 7,874,142 B2 | * | 1/2011 | Beardsley | F02K 1/72 239/265.29 |
| 8,904,751 B2 | * | 12/2014 | Howarth | F02K 1/70 239/265.31 |
| 2012/0023901 A1 | * | 2/2012 | Gilson | F02K 1/09 60/226.3 |
| 2013/0167505 A1 | * | 7/2013 | Gormley | F02K 1/09 60/226.1 |
| 2014/0026536 A1 | * | 1/2014 | Gormley | F02K 1/09 60/204 |
| 2014/0027602 A1 | * | 1/2014 | Layland | B64D 29/06 248/554 |
| 2014/0030057 A1 | * | 1/2014 | Gormley | F01D 25/24 415/1 |
| 2015/0107220 A1 | * | 4/2015 | Chakkera | F02K 1/72 60/226.2 |
| 2016/0363097 A1 | * | 12/2016 | Foutch | F02K 1/72 |

* cited by examiner

*Primary Examiner* — Andrew Nguyen
*Assistant Examiner* — Stephanie Cheng
(74) *Attorney, Agent, or Firm* — O'Shea Getz P.C.

(57) ABSTRACT

A thrust reverser of an aircraft comprises a blocker door and a variable area fan nozzle (VAFN) panel configured to conceal the blocker door from a duct associated with a bypass fan flow when the VAFN panel is in a closed position.

18 Claims, 8 Drawing Sheets

VARIABLE AREA FAN NOZZLE HIDDEN BLOCKER DOOR THRUST REVERSER

BACKGROUND

Figure 1A:
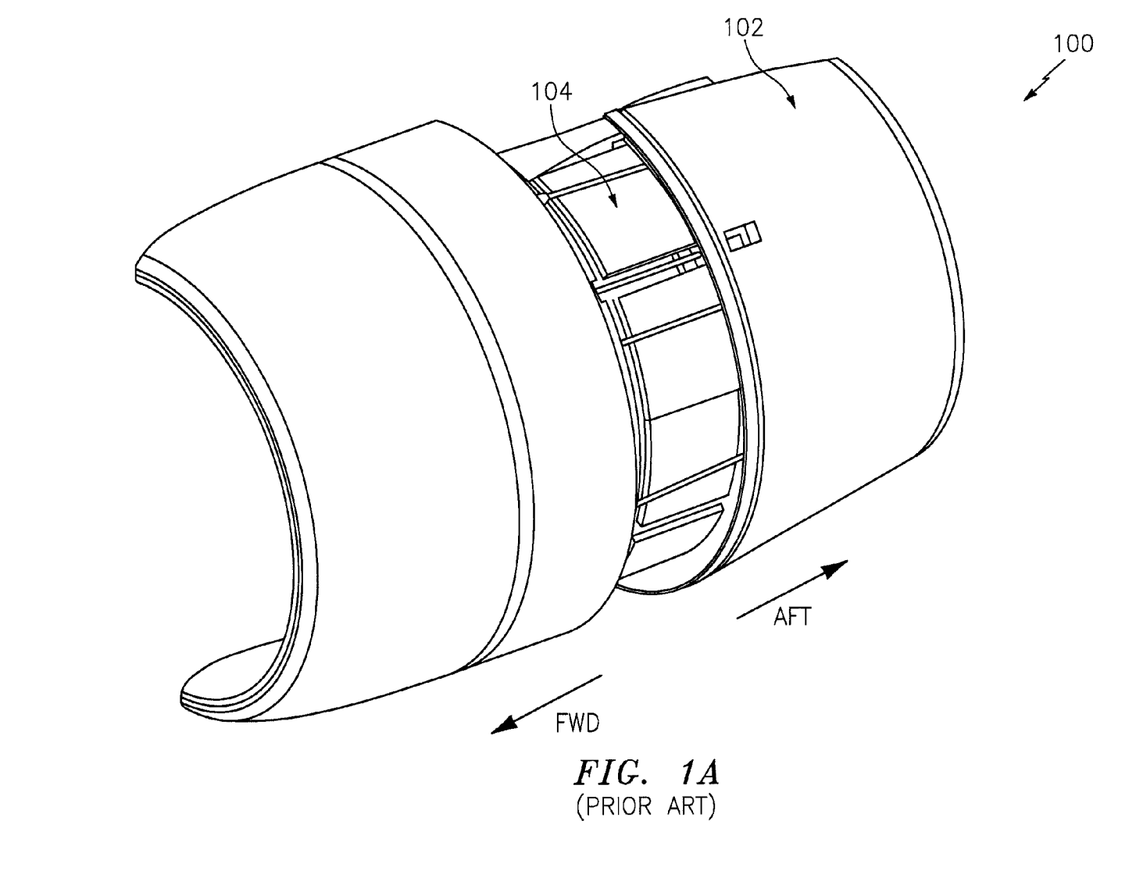
FIG. 1A illustrates a portion of a nacelle in accordance with the prior art.
Figure 1B:
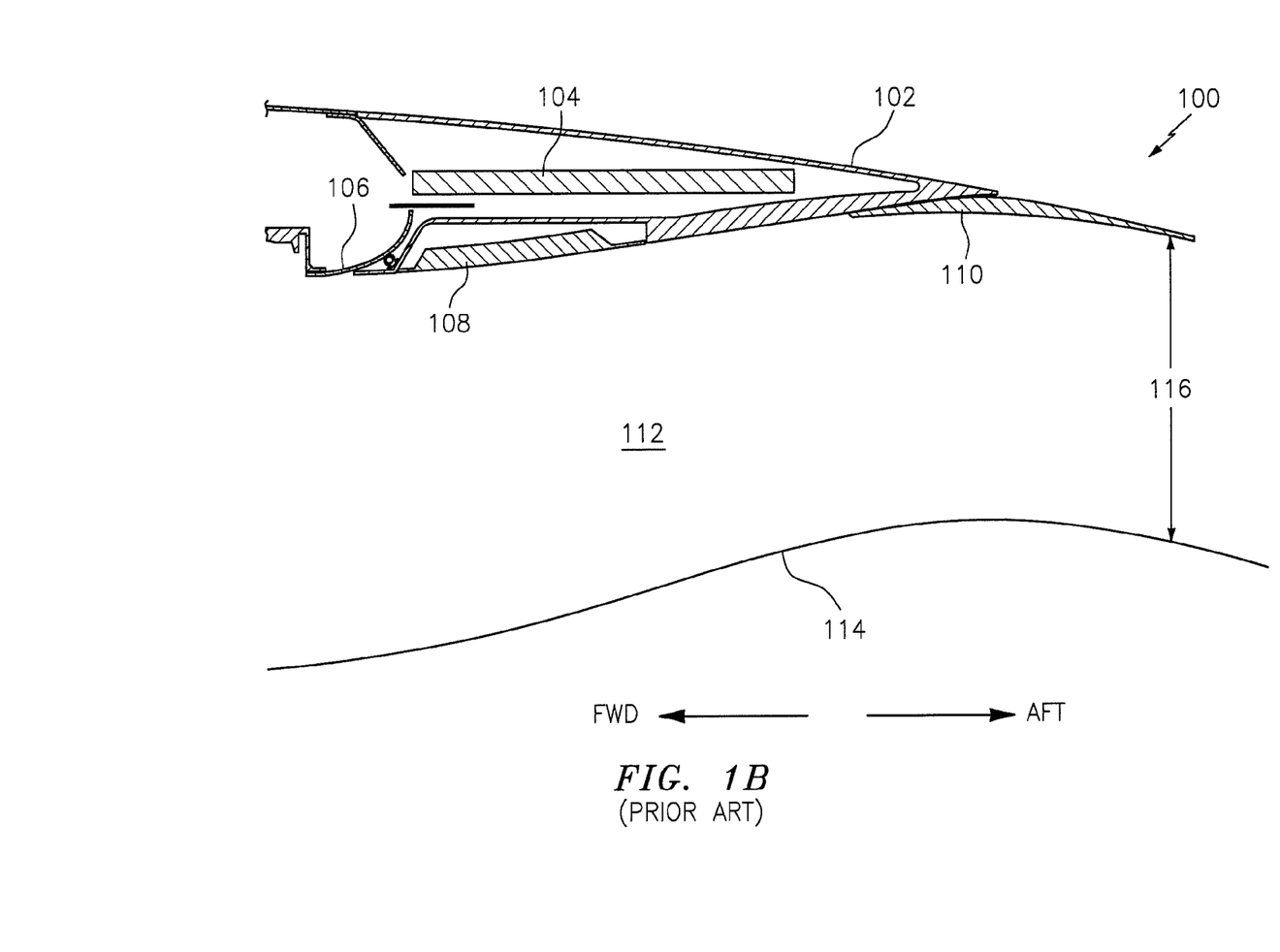
FIG. 1B schematically illustrates components of a thrust reverser in accordance with the prior art.

Referring to FIGS. 1A-1B, a system 100 is shown. The system 100 may be part of, or associated with, a turbo fan engine that utilizes a cascade type thrust reverser. There are typically a plurality of blocker doors 108 that deploy in order to redirect engine bypass air through a set of cascades 104 that turn the airflow out and forward in order to reverse the direction of the thrust of the engine. This may be done to slow an aircraft after landing.

The system 100 includes a sleeve 102 that is translated or moved in, e.g., an aft direction in order to deploy and expose cascades 104 of the thrust reverser. Similarly, in order to place the thrust reverser in a stowed state (e.g., during flight) the sleeve 102 is translated or moved in, e.g., a forward (FWD) direction, such that the sleeve 102 covers the cascades 104 and also may contact or abut a thrust reverser fixed structure 106 and form a seal therebetween to seal against any air leaking through the cascades.

While the radially outer surface of the fan duct 112 is defined mostly by the translating sleeve 102, the radially inner surface of the fan duct 112 is mostly defined by structure 114 typically termed the inner fixed structure (IFS) by those skilled in the art. The IFS 114 is typically fashioned in two halves which join together, one of the halves of a typical IFS is shown in FIG. 1B. The inside surface of the IFS 114 faces the engine core and helps define a chamber around the engine core to protect it. The outer surface of the IFS 114 faces the duct 112 and is smooth to minimize drag.

The system 100 includes a variable area fan nozzle (VAFN) 110. The VAFN 110 is translated forward or aft to control a nozzle area (denoted by arrow 116) associated with the duct 112. As is known to those of skill in this art, opening the VAFN 110 results in less back pressure on the bypass air fan (not shown) which is useful to protect against surge or other conditions potentially harmful to the fan.

Conceptually, or as part of a design philosophy, the VAFN 110 is typically an 'add-on' feature that adds weight and complexity to the propulsion system, but may also result in other offsetting benefits to the fan design. Accordingly, what is needed is a VAFN with overall better system efficiency and operational characteristics than previous VAFN designs.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with a thrust reverser of an aircraft comprising: a blocker door, and a variable area fan nozzle (VAFN) configured to conceal the blocker door from a duct associated with a bypass fan flow when the VAFN is in a closed state. In some embodiments, the VAFN is configured to abut a bull-nose when the VAFN is in the closed state. In some embodiments, the system further comprises a set of cascades, a sleeve configured to expose or conceal the cascades, and a seal between the sleeve and the VAFN. In some embodiments, the system further comprises a second seal between the sleeve and a bull-nose. In some embodiments, the system further comprises an actuator configured to cause a translation of the VAFN. In some embodiments, the actuator is configured to cause a translation of a sleeve that is configured to expose or conceal a set of cascades. In some embodiments, the system further comprises a second actuator configured to cause a translation of a sleeve that is configured to expose or conceal a set of cascades. In some embodiments, the system further comprises a track-and-slider associated with the VAFN. In some embodiments, the track-and-slider is located directly on a fixed structure. In some embodiments, the track-and-slider is located directly on a beam. In some embodiments, the beam is one of a hinge beam or a latch beam. In some embodiments, when the VAFN is in a fully opened state an axial engagement between the VAFN and the track-and-slider is greater than or equal to fifty percent. In some embodiments, the VAFN is in the closed state during a cruise condition of the aircraft. In some embodiments, the VAFN is configured to be at least partially opened when the aircraft is at least one of: on the ground, engaged in a take-off, or engaged in a landing. In some embodiments, the VAFN is configured to be opened when the aircraft is engaged in a landing, and the blocker door is configured to deploy within at least a portion of the duct subsequent to the VAFN being opened.

Aspects of the disclosure are directed to a thrust reverser of an aircraft comprising: a blocker door mounted on the thrust reverser for movement between a stowed position and a deployed position in which the blocker door redirects air in a bypass duct in a reverse thrust direction, and a variable area fan nozzle (VAFN) panel mounted on the thrust reverser for translating movement relative thereto, and configured to translate between a closed position in which the VAFN panel conceals the blocker door from the duct, and an open position in which the VAFN panel position results in an increase in the nozzle cross-sectional area of the duct. In some embodiments, the thrust reverser further comprises a set of cascades, a translating sleeve configured to expose or conceal the cascades, and a seal between the translating sleeve and the VAFN panel. In some embodiments, the thrust reverser further comprises a second seal between the sleeve and a bull-nose. In some embodiments, the thrust reverser further comprises an actuator configured to cause a translation of the VAFN panel. In some embodiments, the thrust reverser further comprises a second actuator configured to cause a translation of a sleeve that is configured to expose or conceal a set of cascades. In some embodiments, the thrust reverser further comprises a track-and-slider system that facilitates the translation of the VAFN panel. In some embodiments, one of a track or a slider of the track-and-slider system is located directly on a fixed structure of the thrust reverser. In some embodiments, the fixed structure is a beam. In some embodiments, the fixed structure is one of a hinge beam or a latch beam. In some embodiments, when the VAFN panel is in the open position, an engagement between the track and the slider of the track-and-slider system remains at or greater than fifty percent of the same engagement when the VAFN panel is in the closed position. In some embodiments, the VAFN panel is configured to be in the closed position during a cruise condition of the aircraft.

Aspects of the disclosure are directed to a method of operating a thrust reverser of an aircraft comprising: translating a variable area fan nozzle (VAFN) panel in an aft direction relative to the aircraft from a closed position to an open position in which the open position of the VAFN panel results in an increased cross-sectional area of a fan bypass nozzle, further translating the VAFN panel in the aft direction from its open position to a reverse thrust position, and translating in the aft direction a translating sleeve from a stowed position to a deployed position simultaneous to or following the translation of the VAFN panel to its reverse thrust position, the translating sleeve in the deployed position causing air to be redirected from a fan bypass duct to outside of the thrust reverser in a reverse thrust direction. In some embodiments, the method further comprises: causing, by the translating sleeve, the air to be redirected from the fan bypass duct by deploying a plurality of blocker doors from a second stowed position to a second deployed position in which the blocker doors are at least partially located in and blocking the fan bypass duct. In some embodiments, the method further comprises: causing, by the translating sleeve, the air to be redirected from the fan bypass duct to outside of the thrust reverser in a reverse thrust direction by passing the air through an array of cascades. In some embodiments, when the VAFN panel is in the closed position a leading edge of the VAFN panel lies in close proximity to a bull nose of the thrust reverser

BRIEF DESCRIPTION OF THE DRAWINGS

The present disclosure is illustrated by way of example and not limited in the accompanying figures in which like reference numerals indicate similar elements.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a variable area fan nozzle (VAFN). When the VAFN is in a closed state/position, a VAFN panel conceals blocker doors so they are not exposed to a bypass air duct.

Figure 2A:
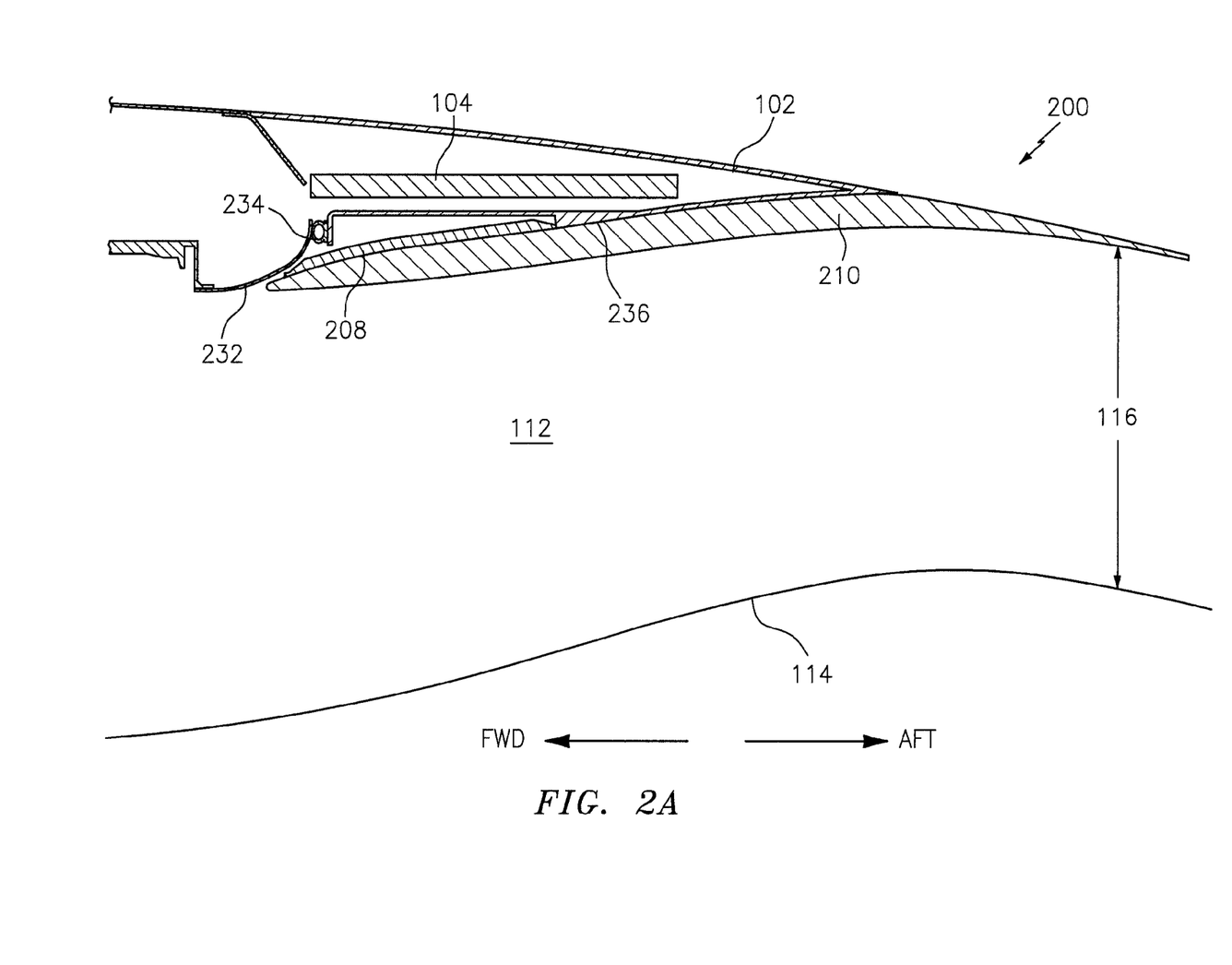
FIG. 2A schematically illustrates a variable area fan nozzle (VAFN) and components of a thrust reverser when the thrust reverser is stowed and the VAFN is closed.

Referring now to FIG. 2A, a system 200 is shown. The system 200 incorporates components/devices that are similar to those described above in connection with FIGS. 1A-1B, and so, a complete re-description is omitted for the sake of brevity. The state of the system 200 depicted in FIG. 2A is associated with a cruise condition of an aircraft when the thrust reverser is stowed and the VAFN is closed.

Whereas the prior art system 100 includes a blocker door 108 that is exposed to the duct 112 as shown in FIG. 1B, a blocker door 208 of the system 200 is concealed from the duct 112 by a VAFN panel 210 when the VAFN is closed. Accordingly, compared to the blocker door 108, the blocker door 208 might not have as many constraints/requirements (e.g., aerodynamic constraints/requirements) imposed on it. Opportunities may be available for redesigning or reconfiguring a blocker door (e.g. the blocker door 208) due to the blocker door being concealed by the VAFN panel 210 when the VAFN is closed.

When the VAFN is closed as shown in FIG. 2A, the leading edge of the VAFN panel 210 may abut or rest in close proximity to a bull-nose 232. The system 200 may include one or more seals; illustrative locations for the seals are identified via reference characters 234 and 236 in FIG. 2A. The seal 234 may be located between the bull-nose 232 and the sleeve 102 to seal against any air leakage around the sleeve 102 when the thrust reverser is stowed. The seal 236 may be between the sleeve 102 and the VAFN panel 210 to seal against any air leaking between them when the VAFN is closed.

Figure 2B:
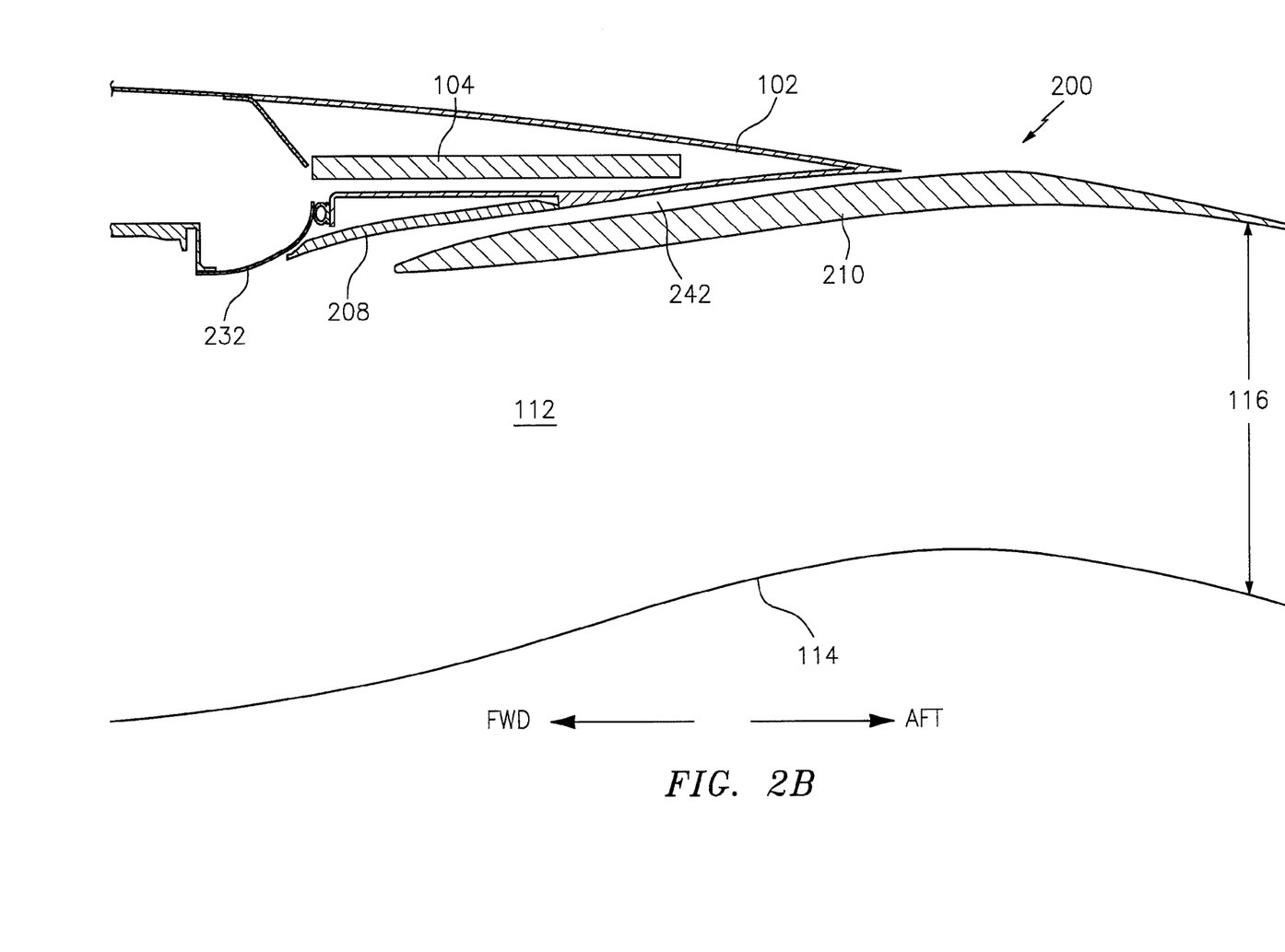
FIG. 2B schematically illustrates the VAFN/thrust reverser of FIG. 2A when the thrust reverser is stowed and the VAFN is partially opened.

FIG. 2B illustrates the system 200 when the thrust reverser is stowed and the VAFN 210 is opened. The state of the system 200 depicted in FIG. 2B may be associated with the aircraft being on the ground, during take-off/ascent, or at the beginning stages of landing/descent. In this position, the VAFN is open so that the nozzle area of the fan bypass air duct 112 is increased compared to when the VAFN is in the closed position.

Relative to FIG. 2A, in FIG. 2B the VAFN panel 210 has been translated to the right (e.g., aft). The translation may be accomplished by one or more actuation mechanisms. In some embodiments, the actuation of the sleeve 102 may be separate/independent of the actuation of the VAFN panel 210. In other embodiments, a common/dependent actuation mechanism may be used to translate the sleeve 102 and the VAFN panel 210, potentially in conjunction with a master-slave type of configuration or a lost motion configuration.

Figure 3A:
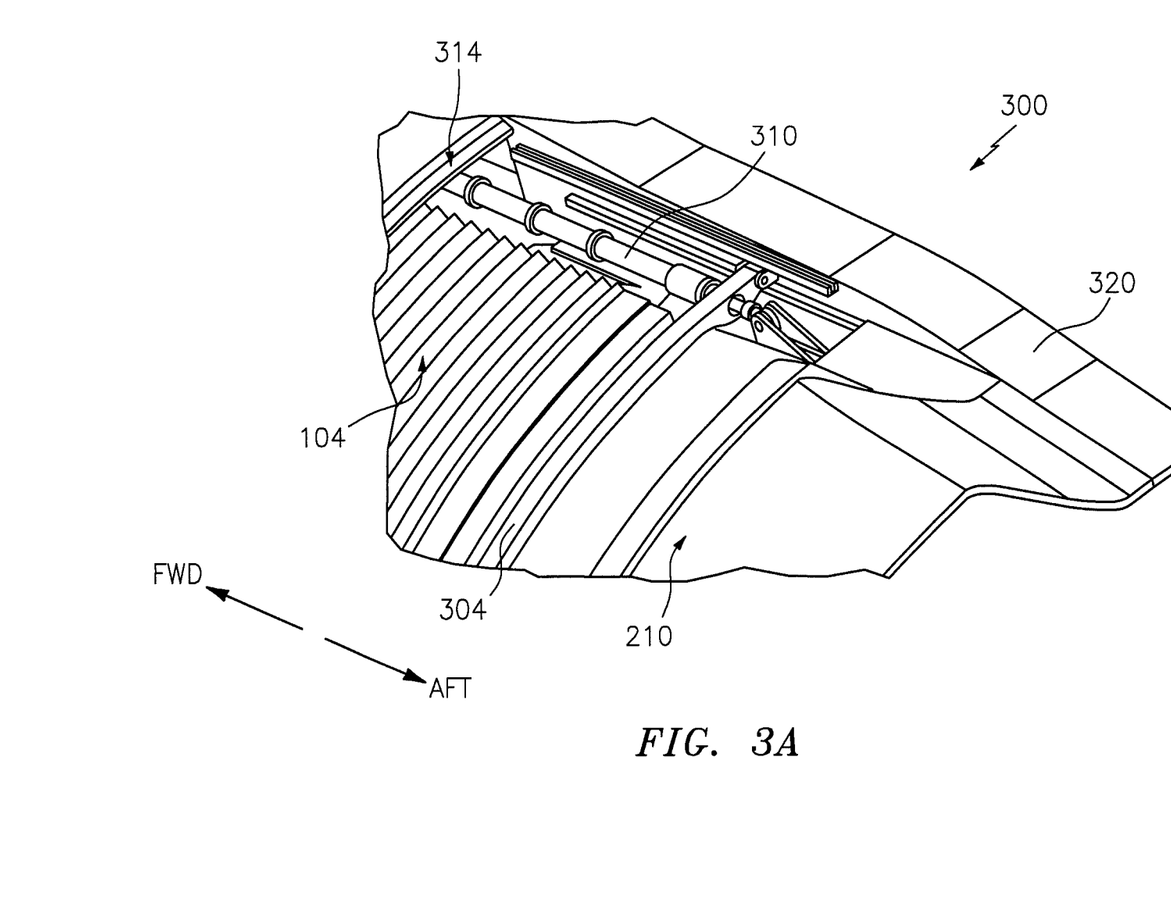
FIG. 3A illustrates a system incorporating an actuator for translating a VAFN.

Referring to FIG. 3A, an exemplary actuation system 300 is shown. The system 300 may be used in conjunction with the system 200, but is exemplary only. Other versions of an actuation system will be apparent to those of skill in this art after understanding this disclosure and may be selected to suit a particular application. As shown in FIG. 3A, an aft cascade ring 304 may be located aft of the cascades 104. In FIG. 3A, the translating sleeve 102 is omitted in order to provide visibility to an actuator 310. The actuator 310 may be used to translate the VAFN panel 210. One end of the actuator 310 may be attached to fixed structure at, e.g., the forward (FWD) end as reflected via reference character 314. The actuator 310 may pass through an opening in the aft cascade ring 304. The other end of the actuation 310 may be attached to the VAFN panel 210.

Figure 3B:
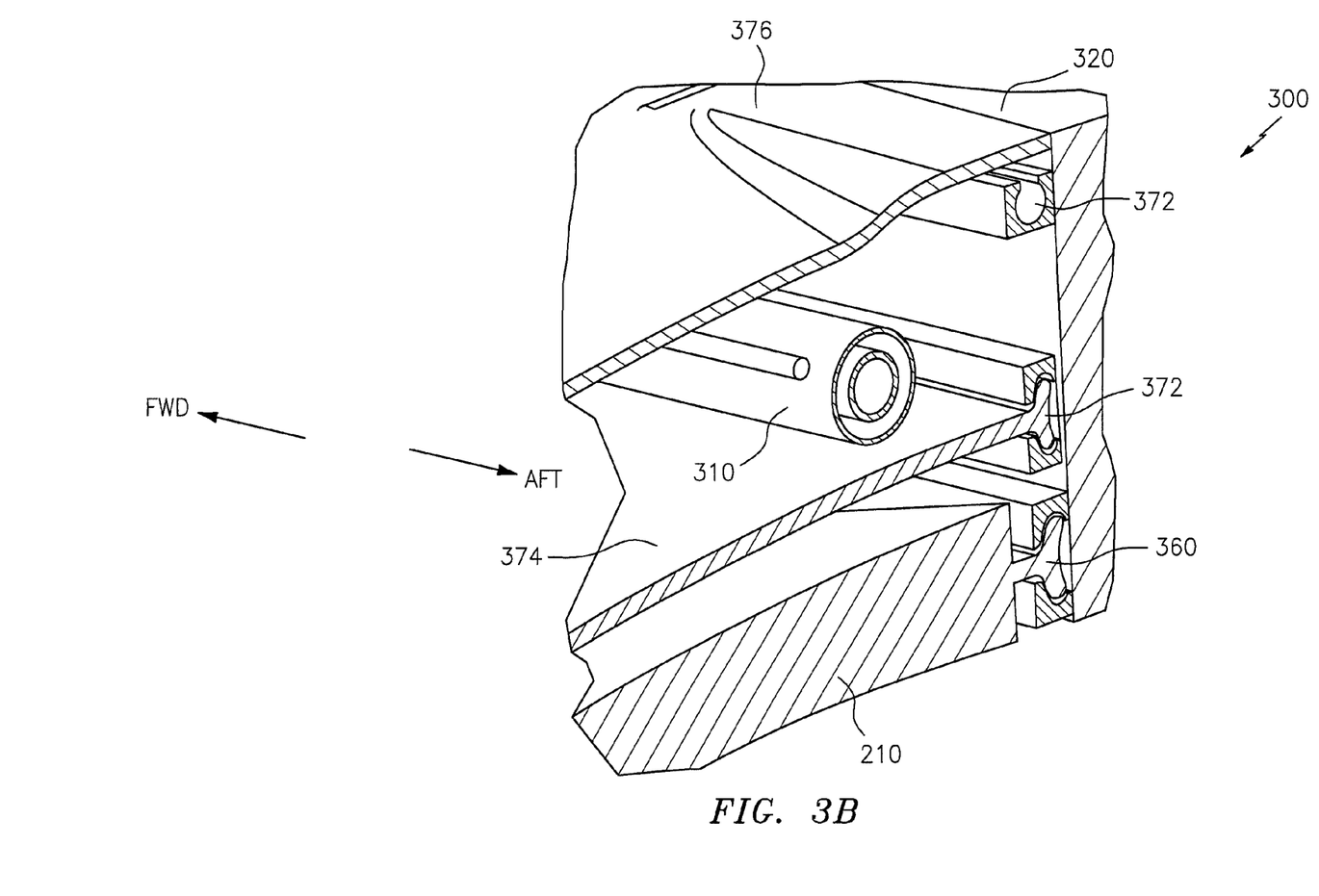
FIG. 3B illustrates the system of FIG. 3A and includes a track-and-slider interface associated with the VAFN.

Actuation of the VAFN panel 210 may be simplified relative to actuation of the VAFN 110. For example, and referring to FIG. 3B, a track-and-slider system 360 may provide for the translating movement of the VAFN panel 210. The track or slider portion of the track-and-slider system 360 may be mounted on the thrust reverser fixed structure (as opposed to on the translating sleeve in many prior art VAFN systems), such as a hinge beam 320 (as shown in FIGS. 3A-3B) or a latch beam (not shown). For completeness, in FIG. 3B primary and auxiliary track-and-slider systems 372, an inner panel/pressure shelf 374, and an outer panel 376 associated with the translating sleeve 102 are shown. A cutout (not shown) formed in the inner panel/pressure shelf 374 will allow a lug on the VAFN panel 210 to be attached to an end of the actuator 310.

Figure 3C:
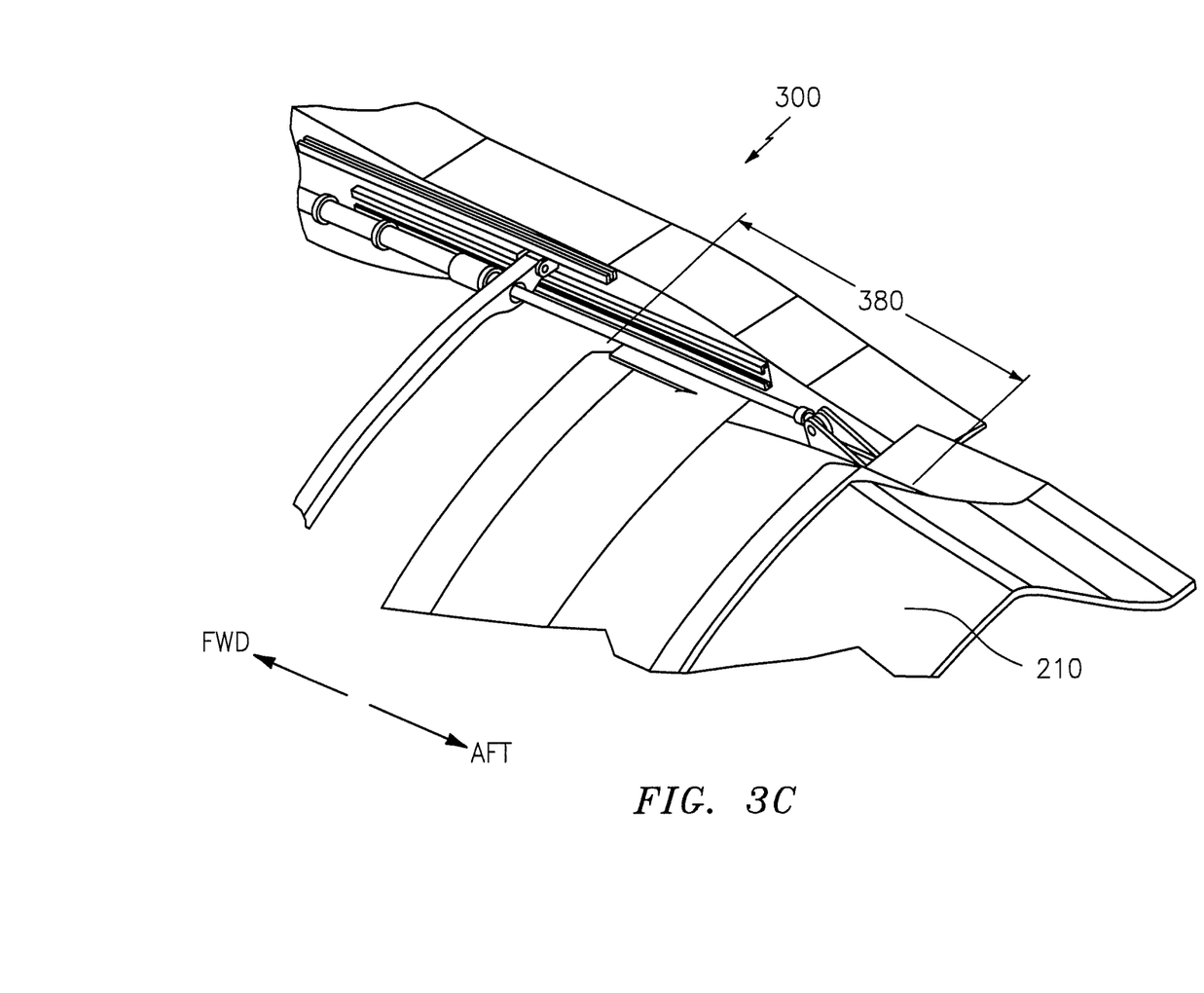
FIG. 3C illustrates the system of FIGS. 3A-3B and demonstrates an engagement between the VAFN and the fixed thrust reverser structure through a track-and-slider interface.

FIG. 3C depicts the VAFN panel 210 in a fully aftward translated position as would be necessary to deploy the thrust reverser (this position is more fully explained below). As shown via reference character/arrows 380 in FIG. 3C, when the VAFN panel 210 is in such a position, an engagement of the slider with the track in the track-and-slider system 360 may remain relatively high, e.g., not less than fifty percent (50%) of the engagement when the VAFN is closed. Such high engagement provides structural stability of the VAFN panel 210 when opened and translated aft for thrust reverser deployment.

Referring back to FIG. 2B, in the VAFN open state, a port 242 may be formed between the VAFN panel 210 and the translating sleeve 102. The cross-sectional area of this port 242 is added to the increased cross sectional area at 116 to determine the total amount of increased cross-sectional nozzle area for the bypass air duct in the VAFN open state. Of course, the port 242 is shown only schematically in FIG. 2B, and in practice its shape would be optimized to increase aerodynamic and thrust efficiency. In the VAFN closed position depicted in FIG. 2A, the port 242 is closed and seal 236 would prevent any air from leaking into it. This type of VAFN is sometimes called a "ported VAFN." It is important to note that the present idea is not applicable solely to a ported VAFN. This idea may be developed into a non-ported, or translating VAFN, by arranging for opposing surfaces on the translating sleeve 102 and on the VAFN panel 210, respectively, to be parallel to one another and in close proximity, and parallel to the line of action of the track-and-slider system 360 so that a continuous, sliding seal may be arranged between them. This would result in a VAFN panel 210 that translates aftward to increase the throat at 116 and increase the nozzle area of the bypass air duct, without opening a port between the VAFN panel 210 and the sleeve 102.

Figure 2C:
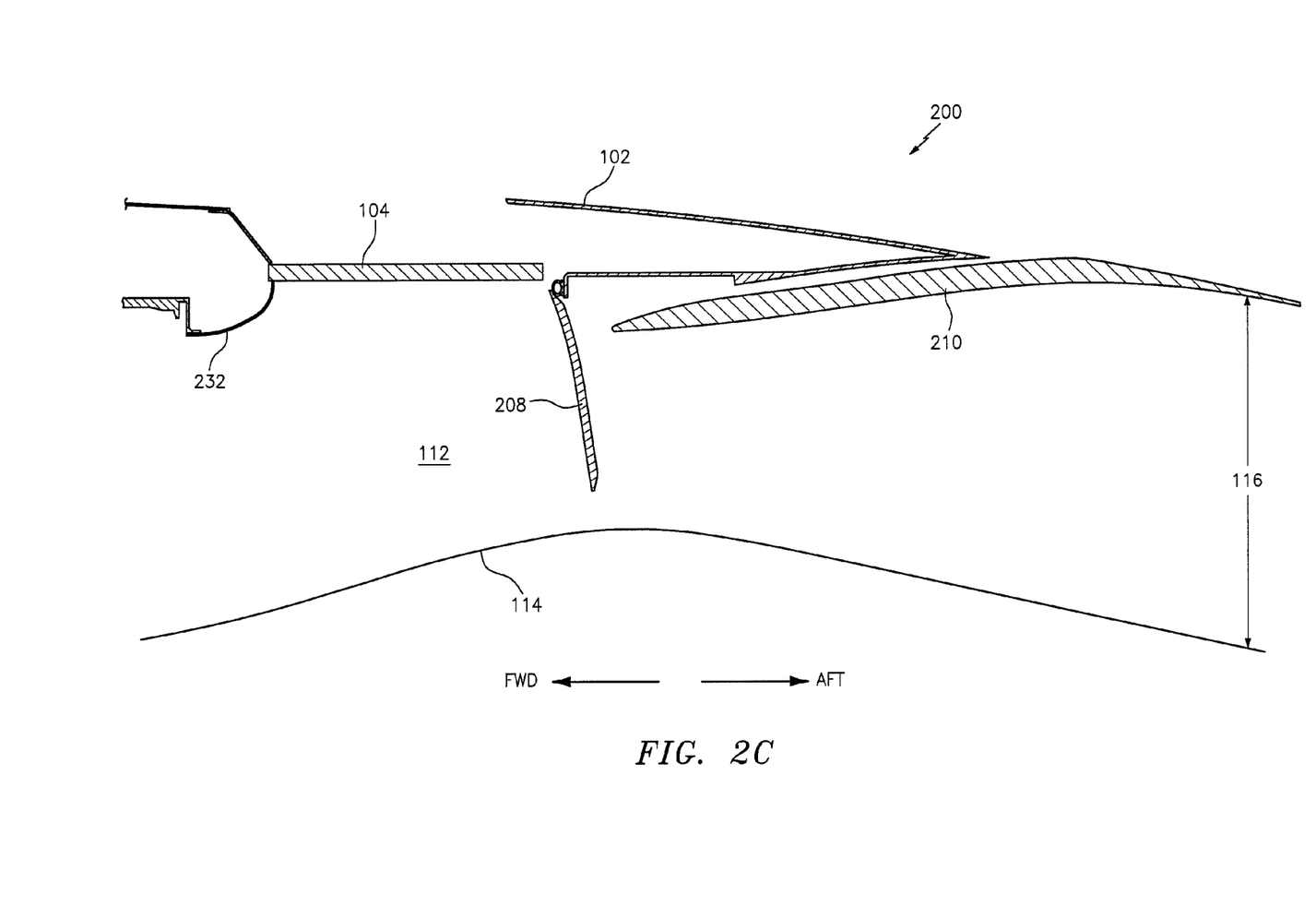
FIG. 2C schematically illustrates the VAFN/thrust reverser of FIG. 2A when the thrust reverser is deployed and the VAFN is opened.

Referring to FIG. 2C, the system 200 is shown with the VAFN translated an additional distance in the aftward direction (beyond its aft position in FIG. 2B with the VAFN open), and with the thrust reverser deployed. The state of the system 200 depicted in FIG. 2C may correspond to the reverse thrust condition when reverse thrust is desired to slow the aircraft. As shown in FIG. 2C, the VAFN panel 210 is in a fully translated state/position (similar to FIG. 3C described above) and the translating sleeve 102 is translated aft (relative to, e.g., FIG. 2B) to enable the blocker door 208 to deploy within at least a portion of the duct 112 and to expose the cascades 104. In this state, a portion of bypass air flow within the duct 112 may be redirected by the blocker doors 208 through the cascades 104 in order to generate reverse thrust. The open position of the VAFN panel 210 as shown in FIG. 2B is not sufficiently aft to permit deployment of the translating sleeve 102, the VAFN panel 210 still blocks the translating sleeve. Thus, the VAFN panel 210 is translated even further aft as shown in FIG. 3C before the translating sleeve 102 may be fully deployed. In effect, the VAFN has three operational positions: a closed position, an open position for VAFN operation, and a reverse thrust position which is further translated aft compared to the open position in order to permit thrust reverser deployment.

There are several options for controlling movement of the translating sleeve 102 and the blocker doors 208 during thrust reverser deployment. As previously mentioned, the same actuator 310 used to translate the VAFN panel 210 could be used to translate the translating sleeve 102, potentially through the use of master-slave actuator system or with a lost motion mechanism or something similar. Or, an independent actuator could be used for the translating sleeve 102. The blocker doors 208 may be actuated by kinematic linkage tied to the translating sleeve 102 (but which is not positioned in the bypass air duct 112, which is different from most prior art thrust reverser designs), such that when the translating sleeve 102 moves relative to the fixed thrust reverser structure, the blocker doors 208 are deployed. The same inventor as is named on this patent application has disclosed several such possible hidden link blocker door kinematic mechanisms in separate patent applications, including in U.S. patent application Ser. No. 14/222,134 filed on Mar. 21, 2014, which is hereby incorporated by reference.

In some embodiments, the entire duct-facing surface of VAFN panel 210 may be acoustically treated. This could be accomplished by, for example, constructing the VAFN panel 210 from a structural acoustic panel, as would be known to those of skill in this art based on a review of this disclosure. The area of acoustic treatment achievable with this design may be much greater than the area of acoustic treatment achievable in traditional thrust reverser designs, especially a thrust reverser incorporating a VAFN, thus making possible more effective noise attenuation.

Potential technical effects and benefits of this disclosure include: (1) a VAFN but with no additional split lines in the duct, and only one additional split on exterior surface of the thrust reverser, (2) blocker doors that are hidden during flight and not exposed to the airflow in the bypass duct, (3) applicability to a ported VAFN or a non-ported VAFN, (4) additional acoustic area compared to traditional designs for decreased noise emissions from the propulsion system, (5) a long VAFN panel that is very stiff, (6) a high VAFN track and slider engagement at all positions of the VAFN panel, (7) VAFN tracks or sliders which are located on fixed structure, simplifying actuation, (8) multiple sealing options for the VAFN, (9) the continued use of cascades to direct the reverse thrust air plume effectively, (10) the thrust reverser uses a traditional pressure shelf design approach, (11) existing thrust reverser seals may continue to be used, potentially without modification, (12) no need for VAFN flat area sealing, and (13) aerodynamic and therefore propulsion efficiency may be improved compared to other traditional designs.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure.

I claim:
1. A thrust reverser of an aircraft comprising: a blocker door mounted on the thrust reverser for movement between a stowed position and a deployed position in which the blocker door redirects air in a bypass duct in a reverse thrust direction;
   a variable area fan nozzle (VAFN) panel mounted on the thrust reverser for translating movement relative thereto, and configured to translate between a closed position in which the VAFN panel conceals the blocker door from the duct, and an open position in which the VAFN panel position results in an increase in the nozzle cross-sectional area of the duct;
   a set of cascades; and
   a translating sleeve configured to expose or conceal the cascades and move relative to the VAFN panel.

2. The thrust reverse of claim 1, further comprising a first seal between the translating sleeve and the VAFN panel.

3. The thrust reverser of claim 2, further comprising: a second seal between the translating sleeve and a bull-nose.

4. The thrust reverser of claim 1, further comprising a first actuator configured to cause a translation of the VAFN panel.

5. The thrust reverser of claim 4, further comprising: a second actuator configured to cause a translation of the translating sleeve that is configured to expose or conceal a set of cascades.

6. The thrust reverser of claim 1, further comprising:
   a track-and-slider system that facilitates the translation of the VAFN panel.

7. The thrust reverser of claim 6, wherein one of a track or a slider of the track-and-slider system is located directly on a fixed structure of the thrust reverser.

8. The thrust reverser of claim 7, wherein the fixed structure is a beam.

9. The thrust reverser of claim 7, wherein the fixed structure is one of a hinge beam or a latch beam.

10. The thrust reverser of claim 7, wherein when the VAFN panel is in the open position, an engagement between the track and the slider of the track-and-slider system remains at or greater than fifty percent of the same engagement when the VAFN panel is in the closed position.

11. The thrust reverser of claim 1, wherein the VAFN panel is configured to be in the closed position during a cruise condition of the aircraft.

12. A method of operating a thrust reverser of an aircraft comprising: translating a variable area fan nozzle (VAFN) panel in an aft direction relative to the aircraft from a closed position to an open position in which the open position of the VAFN panel
   results in an increased cross-sectional area of a fan bypass nozzle,
      wherein the VAFN panel conceals a plurality of blocker doors of the thrust reverser from a fan bypass duct;
   further translating the VAFN panel in the aft direction from its open position to a reverse thrust position; and
   translating in the aft direction a translating sleeve from a stowed position to a deployed position simultaneous to or following the translation of the VAFN panel to its reverse thrust position,
      the translating sleeve in the deployed position causing air to be redirected from the fan bypass duct to outside of the thrust reverser in a reverse thrust direction;
   wherein, when the VAFN panel is in the closed position, a leading edge of the VAFN panel lies in close proximity to a bull nose of the thrust reverser and
   wherein the translating sleeve moves relative to the VAFN panel.

13. The method of claim 12, further comprising: causing, by the translating sleeve, the air to be redirected from the fan bypass duct by deploying the blocker doors from a second stowed position to a second deployed position in which the blocker doors are at least partially located in and blocking the fan bypass duct.

14. The method of claim 13, further comprising:
   causing, by the translating sleeve, the air to be redirected from the fan bypass duct to outside of the thrust reverser in a reverse thrust direction by passing the air through an array of cascades.

15. The method of claim 13, wherein the blocker doors are pivotally mounted to the translating sleeve.

16. The thrust reverser of claim 1, wherein the blocker door is pivotally mounted to the translating sleeve.

17. A thrust reverser of an aircraft comprising: a bullnose;
   a translating structure configured to translate along a centerline between a first position and a second position;
   a blocker door pivotally mounted to the translating structure for movement between a stowed position and a deployed position in which the blocker door redirects air in a bypass duct in a reverse thrust direction; and
   a variable area fan nozzle panel configured to translate along the centerline between a closed position and an open position, wherein the variable area fan nozzle panel lies in close proximity to the bull nose in the closed position,
      and the variable area fan nozzle panel increases in the nozzle cross-sectional area of the bypass duct in the open position;
   wherein the variable area fan nozzle panel is configured to conceal the translating structure from the bypass duct when the variable area fan nozzle panel is in the closed position;
   wherein the variable area fan nozzle panel is configured to conceal the blocker door from the bypass duct when the variable area fan nozzle panel is in the closed position; and
   wherein the translating structure is configured to move relative to the variable area fan nozzle panel.

18. The thrust reverser of claim 17, further comprising a set of cascades, wherein the translating structure comprises a translating sleeve configured to selectively expose and conceal the cascades.

* * * * *

UNITED STATES PATENT AND TRADEMARK OFFICE
CERTIFICATE OF CORRECTION

PATENT NO. : 9,915,226 B2
APPLICATION NO. : 14/743649
DATED : March 13, 2018
INVENTOR(S) : Gormley It is certified that error appears in the above-identified patent and that said Letters Patent is hereby corrected as shown below:

In the Claims

Column 7, Line 14, Claim 2, please delete "reverse" and insert --reverser--.

Signed and Sealed this
First Day of May, 2018

Andrei Iancu
*Director of the United States Patent and Trademark Office*